United States Patent [19]

Preeg

[11] Patent Number: 4,788,424

[45] Date of Patent: Nov. 29, 1988

[54] METHOD AND APPARATUS FOR DETERMINING PARTITIONING OF BOREHOLE AND FORMATION CONSTITUENTS

[75] Inventor: William E. Preeg, Houston, Tex.

[73] Assignee: Schlumberger Technology Corporation, New York, N.Y.

[21] Appl. No.: 728,068

[22] Filed: Apr. 29, 1985

[51] Int. Cl.[4] .............................................. G01V 5/00
[52] U.S. Cl. ..................................... 250/270; 250/262
[58] Field of Search ................................ 250/270, 262

[56] References Cited

U.S. PATENT DOCUMENTS

| | | | |
|---|---|---|---|
| 3,461,291 | 8/1969 | Goodman | 250/83.6 |
| 3,521,064 | 7/1970 | Moran et al. | 250/83.3 |
| 3,532,885 | 10/1970 | Youmans et al. | 250/83.3 |
| 3,546,512 | 12/1970 | Frentrop | 313/61 |
| 3,928,763 | 12/1975 | Scott | 250/270 |
| 3,993,904 | 11/1976 | Newman | 250/270 |
| 4,012,712 | 3/1977 | Nelligan | 340/18 |
| 4,122,338 | 10/1978 | Smith, Jr. et al. | 250/270 |
| 4,315,417 | 2/1982 | Zarudiansky | 62/514 |
| 4,388,529 | 6/1983 | Peelman | 250/270 |
| 4,390,783 | 6/1983 | Grau | 250/270 |
| 4,507,544 | 3/1985 | Hertzog | 250/270 |

*Primary Examiner*—Janice A. Howell
*Assistant Examiner*—Richard Hanig

*Attorney, Agent, or Firm*—David G. Coker; Clifford L. Tager

[57] ABSTRACT

Methods and apparatus are disclosed for producing an indication of the partition between a borehole and a formation of the constituents identified by means of a nuclear investigation. A borehole logging sonde containing a pulsed neutron source and a gamma radiation detector traverses the borehole and resulting capture gamma rays are detected and counted according to energy in each of two time gates. The resulting energy spectra are analyzed to determine the type and relative gamma ray yield of each constituent of the borehole and formation. A characteristic neutron capture decay time constant for each constituent is derived from the yields and total gamma ray counts in the two time gates, and time constants for the borehole and formation overall are set equal to the derived time constants for constituents, such as iron and silicon, occurring predominantly in the borehole and formation respectively. The partition of the remaining constituents is then determined by considering the characteristic time constant for each constituent to be the sum of the time constants for the borehole and formation regions weighted by the proportion of that constituent in each region, the borehole and formation time constants being assumed the same for all constituents and the sum of the proportions being unity.

39 Claims, 3 Drawing Sheets

METHOD AND APPARATUS FOR DETERMINING PARTITIONING OF BOREHOLE AND FORMATION CONSTITUENTS

BACKGROUND OF THE INVENTION

This invention relates to methods and apparatus for determining the composition of subterranean formations and of materials in boreholes traversing such formations; and in particular to such methods and apparatus using spectral analysis of nuclear radiation emanating from the formations and materials.

In nuclear well logging, fast (14 MeV) neutrons are used to bombard the formation adjacent a borehole. Inelastic and capture gamma radiation resulting from interactions between the neutrons and the formation constituents are detected and recorded. Spectral analysis is then used to determine from the recordings the constituents of the formation and borehole. Thus, as described in U.S. Pat. No. 3,521,064 to Moran et al, the detected gamma ray spectrum for a formation of interest is compared with a composite spectrum made up of standard spectra of the constituents postulated to be present in the formation, each standard spectrum being weighted by a corresponding coefficient. The weighing coefficients of the standard spectra are calculated to give a best fit of the composite spectrum to the detected spectrum. These best fit coefficients represent the relative contributions of the corresponding constituents to the total gamma ray spectrum, and they are functions of the relative abundances of those constituents in the formation. Appropriate selection of the standards to be included in the analaysis enables the relative proportions of the constituents of interset, such as carbon, oxygen, chlorine and hydrogen, to be obtained and the desired information regarding oil content to be derived.

In order to penetrate the subterranean formation the fast neutrons must pass through the fluid contents of the borehole before entering the formation. The resulting borehole contributions to the inelastic and capture gamma ray spectra significantly complicate the analysis of the formation composition. One way of accounting for these contributions is to claibrate the logging tool in a reference borehole having known borehole contents and formation compositions. However, this requires a large number of calibration measurements. Also laboratory conditions do not necessarily reflect the real composition of the contents of the borehole, so inaccuracies can result in the constituent proportions obtained from the spectra matching process.

Taking more accurate account of the composition of an individual borehole's contents would enable more accurate information to be obtained concerning the constituents of the earth formations surrounding a borehole. Although the composition of the contents of the borehole may be determined with other logging tools, the use of the logs from such tools to correct the spectral analysis results requires accurate recording of the measurements and of the corresponding positions along the borehole. Separate borehole passes may be required for each measurement, contributing further to errors which arise from merging the data to assure depth correspondence. Each additional log requires additional expense and delay and contributes further errors.

U.S. Pat. No. 4,507,554 to Hertzog and Nelligan, assigned to the assignee of this application, discloses a method of determining the composition of the borehole material in which an inelastic spectrum is recorded during the neutron burst and two capture spectra are obtained in respective timer periods following the burst; one shortly after the burst and a second a much longer time after. The recorded spectra are analysed as described above using sets of standard spectra specific to each time period. It is assumed that the earlier of the two capture spectra contains information about both the borehole and the formation, whereas the later capture spectrum contains information only, or at least primarily, about the formation. Accordingly, the difference between the constituent analyses derived from the capture spectra is taken to indicate the composition of the borehole. This technique has the disadvantage that the time period between successive neutron bursts may be relatively long, to allow the radiation emanating from the borehole constituents to subside sufficiently before the second capture spectrum is recorded. Consequently the logging speed must be relatively low, or alternatively poor depth resolution of the logs must be accepted. In addition, the assumption of little or no borehole contribution to the second capture spectrum is only an approximation, and thus does not necessarily reflect the real environment in which the spectral measurements are made.

It is an object of this invention to provide an improved method and apparatus for determining borehole and formation constituents.

SUMMARY OF THE INVENTION

According to one aspect of this invention there is provided a method of determining the partition of constituents as between a subterranean formation and other material in the region of investigation of a well-logging sonde positioned in a borehole traversing said formation. The material and the formation are bombarded with high energy neutrons from the sonde, and a detection signal representative of gamma radiation resulting from capture of the neutrons by constituents of the material and the formation is generated. First and second signals representative of change in rate of thermal neutron capture in the material and the formation are generated from the detection signal. The detection signal and the first and second signals are then used to generate an output signal representative of the partition of constituents as between the material and the formation. Preferably said first signal is representative of change in rate of thermal neutron capture by a first predetermined constituent occurring predominantly in said material and said second signal is representative of change in rate of thermal neutron capture by a second predetermined constituent occurring predominantly in said formation.

According to another aspect of this invention there is provided a method of determining the partition of constituents as between a subterranean formation and other material in the region of investigation of a well-logging sonde positioned in a borehole traversing said formation, involving bombarding the material and the formation with high energy neutrons from the sonde. First and second detection signals representative of gamma radiation resulting from capture of the neutrons by constituents of the material and the formation during first and second time intervals respectively are generated. A first signal representative of change in rate of thermal neutron capture in the material, and a second signal representative of the capture rate change in the formation, are generated from the detection signals.

Finally an output signal representative of the partition of constituents as between the material and the formation is generated from the detection signals and the capture rate change signals. In addition gamma radiation resulting from inelastic scattering of the neutrons by constituents of the material and the formation may be detected to generate another detection signal, which can be used with the output signal to generate a representation of the respective compositions of the material and the formation.

According to a further aspect of this invention there is provided a method of determining the partition of constituents as between a subterranean formation and other material in the region of investigation of a well-logging sonde positioned in a borehole traversing said formation, in which the material and the formation are bombarded with high energy neutrons from the sonde. Gamma radiation resulting from capture of the neutrons by constituents of the material and the formation during a first time interval is detected and a first detection signal representative thereof is generated. Likewise, gamma radiation resulting from capture of the neutrons during a second time interval is detected and a second detection signal generated. Additional signals representative of change in rate of thermal neutron capture by each constituent of the material and the formation, including a first signal for a first predetermined constituent occurring predominantly in the material and a second signal for a second predetermined constituent occurring predominantly in the formation, are generated from the detection signals. Each rate change signal for a constituent other than the first and second predetermined constituents is then used with the first and second signals to generate an output signal representative of the partition of that constituent as between the material and the formation.

According to another aspect of this invention there is provided apparatus for determining the partition of constituents as between a subterranean formation and other material in the region of investigation of a well-logging sonde positioned in a borehole traversing said formation, the sonde bombarding the material and the formation with high energy neutrons thereby generating gamma radiation, comprising: means for generating a signal representative of gamma radiation resulting from capture of the neutrons by constituents of the material and the formation; means for generating from the radiation representative signal a first signal representative of change in rate of thermal neutron capture in the material; means for generating from the radiation representative signal a second signal representative of change in rate of thermal neutron capture in the formation; and means for generating from the radiation representative signal and the first and second signals an output signal representative of the partition of constituents as between the material and the formation.

BRIEF DESCRIPTION OF THE DRAWINGS

Additional objects and features of the invention will become more apparent upon consideration of the following detailed description of the invention, reference being had to the accompanying drawings in which.

DETAILED DESCRIPTION

Figure 1:
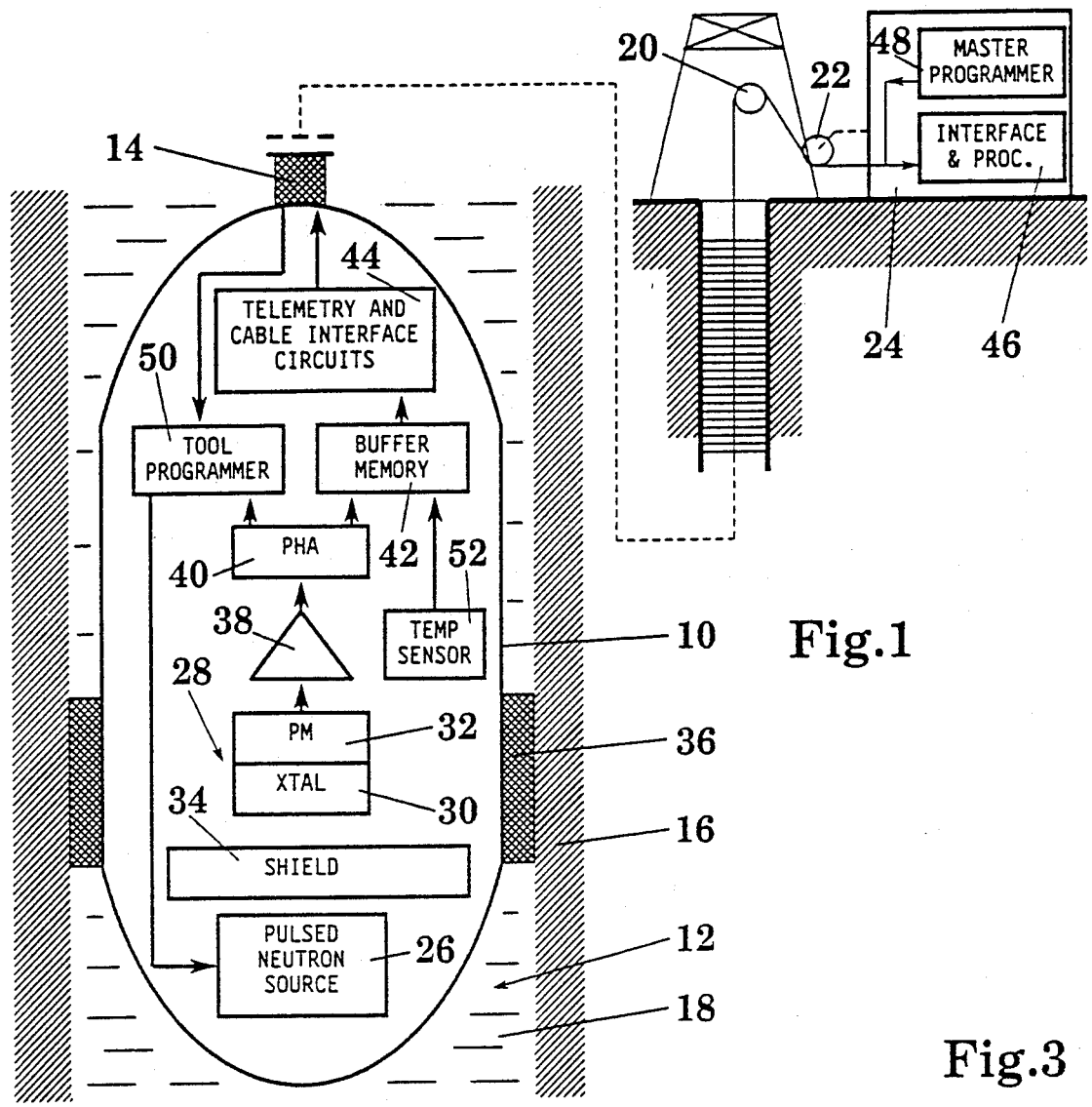
FIG. 1 is a schematic diagram of a sonde forming part of an apparatus in accordance with the invention.

Referring to the drawings, FIG. 1 shows a sonde 10 suspended in a borehole 12 on an armored multi-conductor cable 14. The borehole 12 traverses a formation 16 and is filled with fluid 18, and may be open as shown or cased. The sonde 10 as described below may be constructed in accordance with U.S. Pat. No. 4,390,783 to Grau, assigned to the assignee of the present application. Other sondes suitable for use in implementing the present invention will occur to those skilled in the art. The sonde 10 is moved in the borehole 12 by paying the cable 14 out and (while the logging measurements are actually being made) reeling it back in over a sheave wheel 20 and a depth gauge 22 by means of a winch forming part of a surface equipment 24.

The sonde 10 includes a pulsed neutron source 26 for producing primary radiation to bombard the formation 16 with fast neutrons as the sonde 10 travels up the borehole 12, and a radiation detector 28 for detecting secondary (gamma) radiation induced thereby in the borehole 12 and the formation 16. The neutron source 26 is preferably of the pulsed accelerator type described in U.S. Pat. Nos. 3,461,291 to Goodman and 3,546,512 to Frentrop, both commonly owned with this application. This type of source is particularly suited to the generation of discrete bursts of high energy or fast neutrons, e.g. at 14 MeV, with a controlled duration and repetition rate.

The detector 28 may be of any type appropriate to the detection of gamma radiation and the production of an electrical signal corresponding to each detected gamma ray and having an amplitude representative of the energy of the gamma ray. Typically the detector 28 includes a scintillation crystal 30 which is optically coupled to a photomultiplier 32. The crystal may be of the thallium-activated sodium iodide type, although any other suitable crystal such as thallium or sodium activated cesium iodide or bismuth germanate, for example, may be used. Alternatively a solid-state detector, having a germanium crystal for example, may be used to produce the required signal directly and with sharp energy resolution. In this case, the sonde 10 may be modified to maintain the detector at a suitably low temperature for correct operation, using for example the cryostat described in U.S. Pat. No. 4,315,417 to Zarudiansky.

A neutron shield 34 can be placed between the source 26 and the detector 28 to limit direct bombardment of the detector 28 by neutrons from the source 26. The sonde 10 may be surrounded by a boron carbide impregnated sleeve 36 in the general location of the source 26 and the detector 28. This sleeve acts as a neutron absorber for attenuating over time neutron interactions which occur in the immediate vicinity of the source 26 and the detector 28 (that is, in the borehole 12) and which produce detectable gamma rays.

Electrical power for the sonde 10 is supplied via the cable 14 from the surface equipment 24. The sonde 10 includes power conditioning circuitry (not shown) for feeding power at appropriate voltage and current levels to the source 26, the detector 28 and other downhole circuits. These circuits include an amplifier 38 which receives the output pulses from the photomultiplier 32. The amplified pulses are then applied to a pulse height analyzer (PHA) 40 which may be of any conventional type such as the single ramp (Wilkinson rundown) type. Other suitable pulse height analog to digital converters may be used for the gamma ray energy range to be analyzed. Linear gating circuits may also be employed for control of the time portion of the detector signal frame to be analyzed. Improved performance can be obtained by the use of additional conventional techniques such as pulse pile-up rejection.

Figure 3:
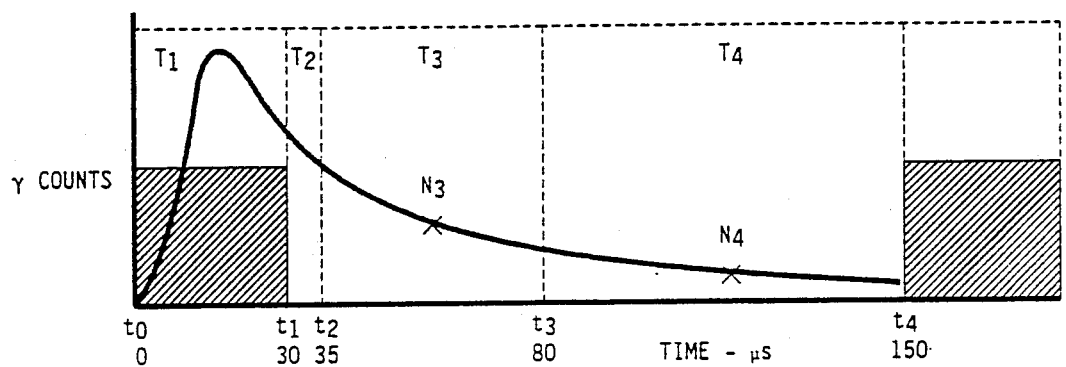
FIG. 3 is a schematic graph showing the time relationship of neutron bursts and gamma radiation measurements during operation of the sonde.

Pulse height analyzer 40 assigns each detector pulse to one of a number (typically in the range 256 to 8000) of predetermined channels according to its amplitude (i.e. the gamma ray energy), and supplies a signal in suitable digital form representing the channel or amplitude of each analyzed pulse. The occurrences of each channel number in the digital output of pulse height analyzer 40 are accumulated in a buffer memory 42 to provide an energy spectrum, which is then transferred to telemetry and cable interface circuits 44 for transmission over the cable 14 to the surface equipment 24. Buffer memory 42 is arranged to accumulate spectral counts during several separate portions or time gates starting with each burst of neutrons from the neutron source 26, with at least two time gates after the burst. This is illustrated in FIG. 3 which is a diagrammatic representation of the time distribution of gamma rays resulting from the irradiation of an earth formation with a burst of fast neutrons. Thus, in the illustrated embodiment, a first time gate $T_1$ is coincident with the neutron burst (indicated by the hatched area) and lasts for thirty microseconds, from $t_0$ to $t_1$, during which a spectrum of gamma radiation arising from inelastic interactions between neutrons and nuclei is acquired. A second time gate $T_2$ starting at $t_1$ and lasting five microseconds until $t_2$ allows the inelastic radiation to subside before a first spectrum of gamma radiation arising from neutron capture is acquired in a third time gate $T_3$ lasting forty-five microseconds, from $t_2$ to $t_3$. A second capture gamma radiation spectrum is then acquired in a fourth and final time gate $T_4$ lasting a further seventy microseconds, between $t_3$ and $t_4$. Thereafter the neutron burst and associated cycle of four times gates is repeated. Whereas the sonde 10 is conventionally operated to bombard the formation 16 with neutron bursts at one hundred microsecond intervals, it can be seen from FIG. 3 that in the preferred embodiment of this invention the intervals are extended to one hundred and fifty microseconds.

At the surface the cable signals are received by cable interface and signal processing circuits 46. It will be understood that the circuits 44 and 46 may be of any suitable known construction for encoding and decoding, multiplexing and demultiplexing, amplifying and otherwise processing the signals for transmission to and reception by the surface equipment 24. Appropriate circuits are described, for example, in U.S. Pat. No. 4,012,712 to Nelligan.

The operation of the sonde 10 is controlled by signals sent downhole from a master programmer 48, located in the surface equipment 24. These signals are received by a tool programmer 50 which transmits control signals to the neutron source 26 and the pulse height analyzer 40. In addition, the sonde 10 may contain a temperature sensor 52 which compensates the measurements from the sonde 10 for the temperature of the borehole fluids 18.

The surface equipment includes the various electronic circuits used in accord with the present invention. These circuits may comprise special purpose hardware as shown in FIG. 2, or alternatively a general purpose computer appropriately programmed to perform the same tasks as such hardware.

Figure 2:
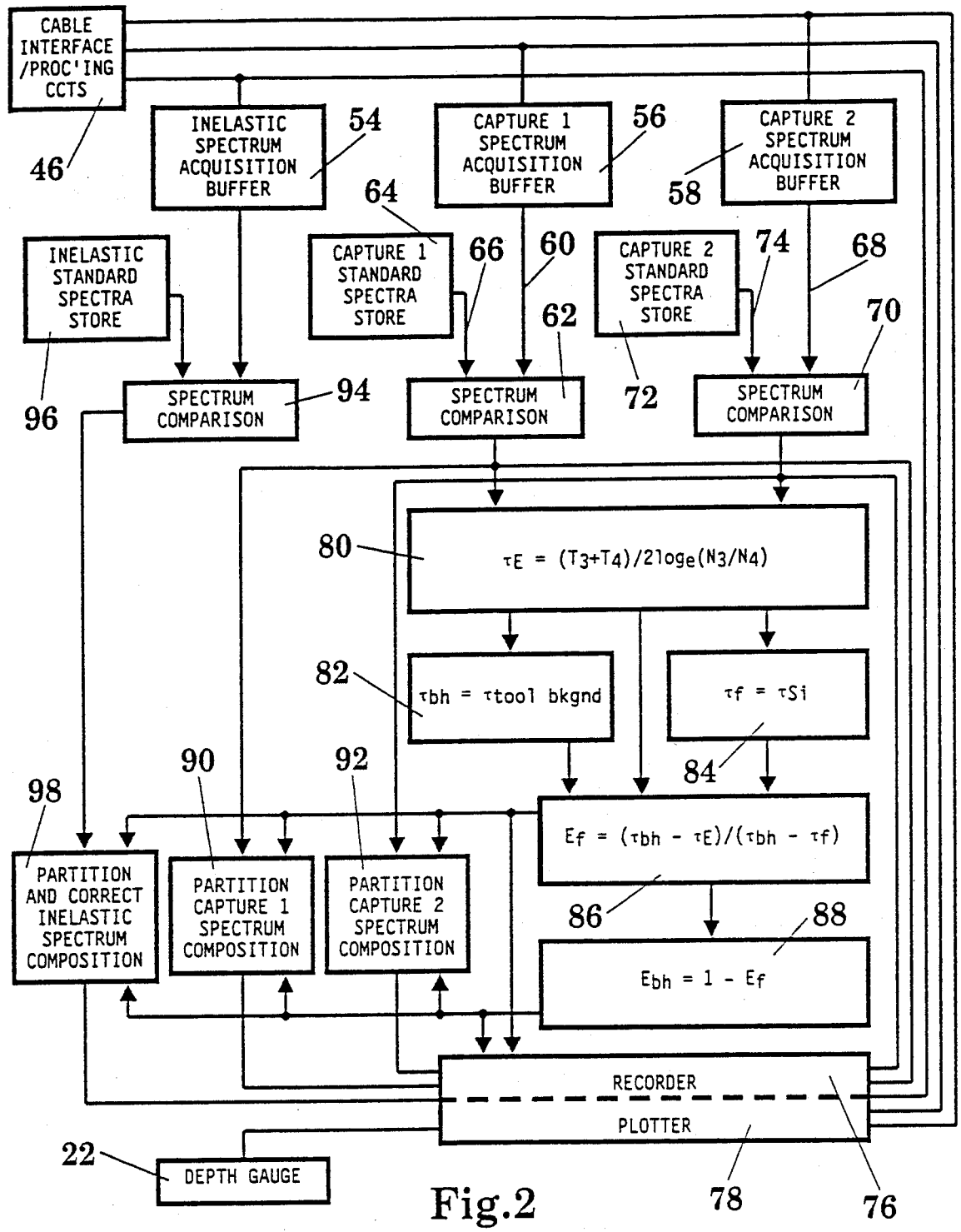
FIG. 2 is a schematic diagram of surface equipment forming another part of the apparatus.

Referring to FIG. 2, the cable interface and signal processing circuits 46 suitably decode the information received from the well logging sonde 10 and transmit this information for the time gates $T_1$, $T_3$ and $T_4$ to, respectively, an inelastic spectrum acquisition buffer 54, a first capture spectrum acquisition buffer 56 and a second capture spectrum acquisition buffer 58. Spectral data from the first capture spectrum acquisition buffer 56 is supplied via line 60 to a spectrum comparison circuit 62, which also receives data corresponding to spectral standards from a first capture standard spectra store 64 via a line 66. These standard spectra may be determined in the laboratory and include spectra for the anticipated constituents of the formation 16 and the borehole 12. Typically these constituents are elements, but they may also include more complex materials, such as compounds known to occur in the borehole 12 and/or the formation 16. In particular an artificial constituent' may be provided to allow conveniently for the aggregate contribution to the observed gamma radiation spectrum of the materials, including the detector crystal of the logging sonde 10 itself, as described in copending patent application Ser. No. 525,342, now U.S. Pat. No. 4,587,424 of Grau. This additional constituent' is herein referred to as the tool background signal. A weighted superimposition of the elemental standard sectra which best matches the spectral data from the buffer 56 is derived by the comparison circuit 62, for example by means of a least squares fitting technique, to determine the contribution $E_3$ of each constituent E to the observed spectrum. The weightings or coefficients $E_3$ thus derived are output by the spectrum comparison circuit 62 to indicate the constituents of the formation 16 and of the borehole contents.

Likewise, information is the second capture spectrum acquisition buffer 58 passes over a line 68 to another spectrum comparison circuit 70, where the information is compared with second capture standard spectra supplied from a store 72 over a line 74. These second capture standard spectra may also be determined in the laboratory to correspond to the $T_4$ time gate and include spectra for those constituents that may be expected to appear in the formation 16 and borehole 12. The comparison circuit 70 provides output signals $E_4$ indicative of the relative gamma ray yields of formation constituents E contributing to the second capture gamma spectrum. Those skilled in the art will appreciate that correction of the detected spectra for dead time losses before comparison may be desirable to obtain maximum accuracy.

The constituent weightings $E_3$ and $E_4$ determined by the comparison circuits 62 and 70 are recorded by a recording device 76, along with the inelastic, first and second capture spectra received from the sonde 10 via the interface and processing circuits 46, and the depth signals provided by the depth gauge 22. The data can also be supplied to drive a plotter 78 to provide a graphical presentation of the derived constituents as a function of borehole depth.

The rate of occurrence of capture gamma rays detected by the sonde 10 is dependent on the rate of capture of thermal neutrons by the formation and borehole constituents, and this is in turn dependent on the number of neutrons present. Thus change in the rate of occurrence of capture gamma rays as between the time gates $T_3$ and $T_4$ is related to change in the rate of thermal neutron capture, and to change in the thermal neutron population level. In accordance with the present invention it is assumed that change in the neutron population in the borehole 12 affects all borehole constituents uniformly and is dependent on the aggregate effect of neutron capture by all those constituents, so change is characteristic of the overall borehole material composition. Likewise, change in the neutron population in the formation 16 affects all formation constituents uniformly and is dependent on the aggregate effect of neutron capture by all those constituents. Thus such change is characteristic of the overall formation composition and, since this is different from the borehole material composition, the borehole 12 and the formation 16 are expected to have different characteristic changes with time in the rate of thermal neutron capture.

The total rate $R(t)$ of thermal neutron capture for each constituent E is therefore assumed to be given by the sum of two (or more) exponential decay terms, as follows:

$$R(t) = E_{bh} \times e^{-t/\tau_{bh}} + E_f \times e^{-t/\tau_f} \quad (1)$$

where $E_{bh}$ and $E_f$ are the partitions of the constituent E as between the borehole 12 and the formation 16, $\tau_{bh}$ is an exponential decay time constant characteristic of the borehole material and $\tau_f$ is another exponential decay time constant characteristic of the formation 16. $\tau_{bh}$ and $\tau_f$ are assumed to be the same for all constituents of the borehole material and the formation 16 respectively. The overall rate $R(t)$ of thermal neutron capture is itself attributed a characteristic decay time constant $\tau_E$, which is approximated by a function of the time constants $\tau_{bh}$ and $\tau_f$, for example as follows:

$$\tau_E = \tau_{bh} \times E_{bh} + \tau_f \times E_f \quad (2)$$

$$E_{bh} + E_f = 1 \quad (3)$$

The linear approximation in equation (2) has been found to be adequate, but more complex functions such as a quadratic form, could be used. The three time constants in equations (2) and (3) are determined, one ($\tau_E$) by measurement and the other two by calculation, and the equations solved to find $E_{bh}$ and $E_f$, that is the fraction of each constituent that is in the borehole 12 and the formation 16 respectively.

Accordingly, the outputs of the spectrum comparison circuits 62 and 70 are also supplied to an evaluation circuit 80, in order to derive a value for the overall characteristic time constant $\tau_E$ for each constituent E identified by the spectral analysis. This time constant is obtained by multiplying the relative yield $E_3$ of the constituent E by the total number of gamma ray counts accumulated in the corresponding time gate $T_3$ to determine the number of $N_3$ (see FIG. 3) of counts due to that constituent in the first capture time gate; and likewise multiplying the relative yield $E_4$ by the total number of counts accumulated in the time gate $T_4$ to determine the number $N_4$ of counts for that constituent in the second capture time gate. These values are then used to evaluate $\tau_E$ according to the equation $$\tau_E = (T_3 + T_4)/2\log_e(N_3/N_4) \quad (4)$$

$\tau_{bh}$ is determined in circuit 82 by setting it equal to the value of $\tau_E$ for a constituent that is predominantly found in the borehole 12, in which case $E_f$ in equation (2) is effectively equal to zero and $E_{bh}$ is effectively equal to unity. As indicated in FIG. 2, a convenient choice of constituent is the above-mentioned artificial tool background constituent, which by definition relates to material (the tool) which is located solely in the borehole 12. Alternative possibilities for determining the borehole time constant $\tau_{bh}$ are the characteristic time constants determined in circuit 80 for the iron or chlorine constituents.

Likewise the formation time constant $\tau_f$ is deteremined in circuit 84 by setting it equal to the value of the characteristic time constant $\tau_E$ for a constituent that occurs predominantly in the formation 16. In an open (uncased) borehole, suitable constituents include silicon and calcium. Another possibility, depending on the local conditions, is chlorine. For cased boreholes, the silicon and calcium values may not be usable, since both are present in significant quantities in the cement used to secure and seal the casing in the borehole.

The values for $\tau_E$, $\tau_{bh}$ and $\tau_f$ are supplied to a ratio circuit 86 which derives a value for the partition of each constituent E in the formation 16 according to the equation $$E_f = (\tau_{bh} - \tau_E)/(\tau_{bh} - \tau_f) \quad (5)$$

This value is then subtracted from unity in subtraction circuit 88 to derive the partition of constituent E in the borehole 12, $E_{bh}$. These partition values are supplied to the recorder 76, and also to partition circuits 90 and 92 for deriving values for the proportions of the constituents of the borehole 12 and the formation 16 individually, in accordance with the calculated partition of these constituents between the two environments. The partitioned values are likewise supplied to the recorder 76. The partitioning may include weighting and normalization operations if the outputs of the spectrum comparison circuits 62 and 70 do not contain constituent information in terms of mass per unit volume.

In addition the inelastic spectrum acquisition buffer circuit 54 transmits information to a spectrum comparison circuit 94 which compares the information with standard inelastic spectra data stored in store 96. This comparison circuit operates similarly to the comparison circuits 62 and 70 to derive relative gamma ray yields of borehole and formation constituents, including elements such as oxygen and carbon which are not determinable with the capture spectra but which are useful in the analysis of the formation 16. The yields thus derived are, however, skewed in relation to some constituents by the data for other constituents which are present in the borehole 12. For example, the salinity of the borehole 12, which is related to its chlorine content, may significantly perturb a determined carbon/oxygen ratio. Therefore the borehole and formation partitions derived in circuits 86 and 88 are supplied along with the inelastic spectra constituent data to a partition and correction circuit 98, to permit the determined yields for the inelastic spectra constituents to be apportioned as between the borehole 12 and the formation 16 in accordance with the calculated partitions, and for corrections to be made for inaccuracies caused by the determined borehole salinity. Since the depth of investigation of the capture gamma interaction differs from that of the inelastic interaction, the partition values derived from the capture spectra are appropriately modified in the circuit 98 before being applied to the inelastic spectrum constituent yields. The partitioned and corrected data are passed to the recorder 76 and if desired to the plotter 78.

The capture spectra partitions may also be used in providing compensation for the effects of background capture radiation on the inelastic spectral measurement. Thus, the capture decay curve for each constituent identified in the capture spectra can be extrapolated back into the inelastic time gate $T_1$ to derive a correction for that constituent to be subtracted from the inelastic spectrum before comparison with the standard spectra.

Figures 4, 5:
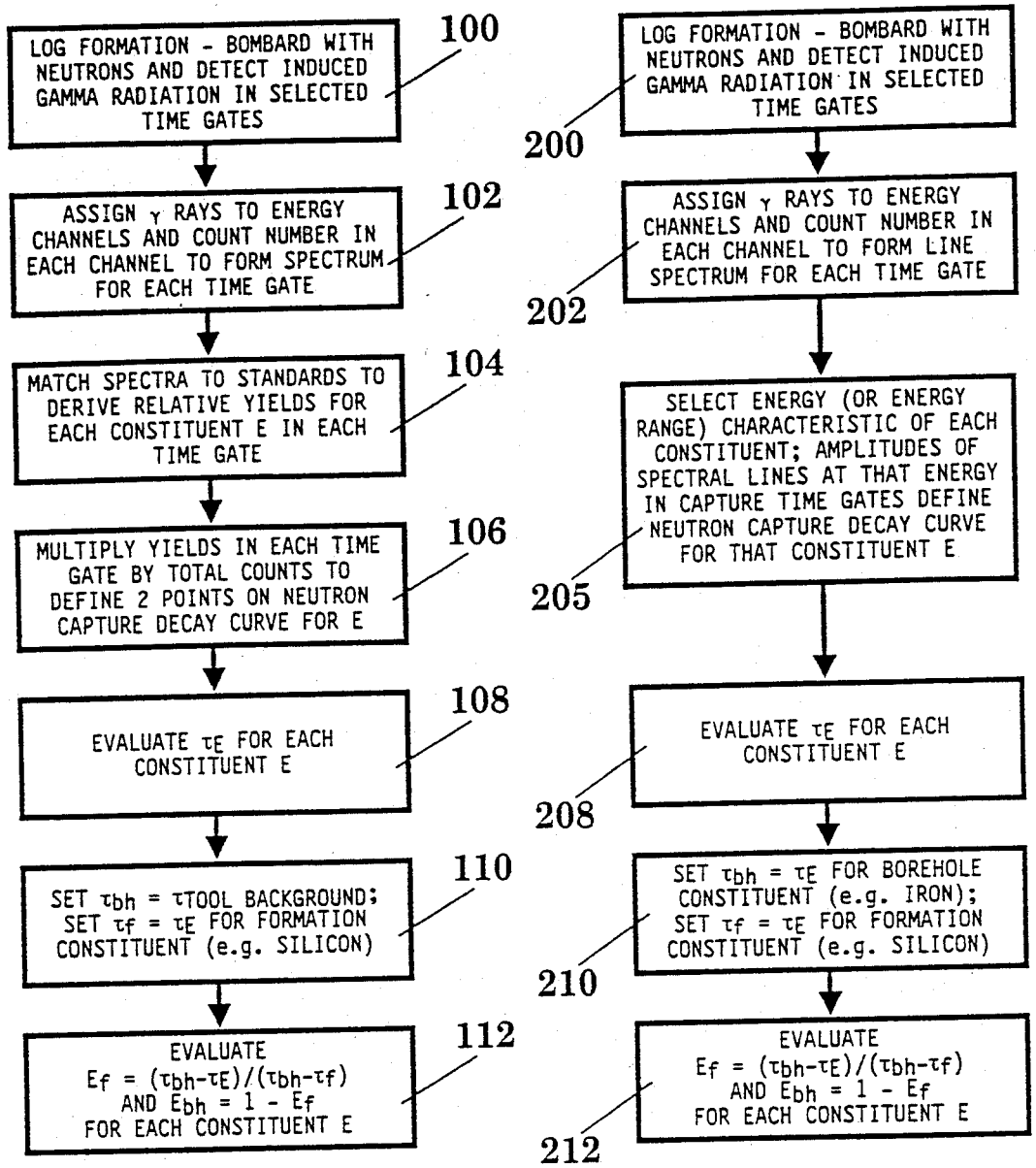
FIG. 4 is a flow chart illustrating a method in accordance with the invention.
FIG. 5 is a flow chart illustrating another method in accordance with the invention.

The method described above in relation to the sonde 10 shown in FIG. 1 is illustrated in flow chart form in FIG. 4. Thus, while the sonde 10 is drawn up the borehole 12, the formation 16 is repetitively bombarded with bursts of neutrons and the inelastic and capture gamma radiation induced thereby is detected in each of several corresponding time gates, as indicated at 100 in FIG. 4. At 102, the capture gamma rays are assigned to channels in accordance with their energy and the number occurring in each channel is counted to form an energy spectrum for each of two capture time gates. These spectra are matched to standard spectra at 104 to find the relative contributions to the total gamma ray yield of each constituent of the borehole material and the formation 16, for each time gate. The relative yields for each time gate are then multiplied by the total number of capture gamma ray counts for that time gate, at 106, to find two points on the neutron capture decay curve for each constituent E. The overall characteristic decay time constant for each constituent is evaluated at 108 using equation (3), and the values thus found for the tool background constituent and a formation constituent such as silicon are assigned at 110 as the borehole and formation characteristic decay time constants respectively. Finally, at 112, these time constants are used to derive the required partitions of each constituent between the borehole 12 and the formation 16.

Because of the relatively low resolution of the combination of the scintillator 30 and photomultiplier 32, the resulting energy spectrum is smoothed and continuous in nature. Hence it is necessary to identify the constituents and their relative yields at 104 and then multiply by the total number of counts at 106 before the decay time constant for each constituent can be found at 108. However, as noted above, it is possible instead to use a solid-state device such as a germanium crystal in the detector 28. Such a device has the advantage of providing a gamma radiation energy spectrum in which the individual spectral lines characteristic of each constituent are clearly distinguishable. In this case the method of FIG. 4 can be modified as illustrated in FIG. 5, in which the operations at 200, 208 and 212 are identical to the operations 100, 108 and 112 of FIG. 4. At 202, the detected gamma radiation is assigned to channels according to energy and counted to form a line spectrum. Operations 104 and 106 of FIG. 4 are replaced by operation 205, in which the number of gamma ray counts for each individual borehole and formation constituent is obtained directly from the amplitude (count) of a spectral line, or group of adjacent lines, selected according to energy as characteristic of that constituent, in both of the capture time gates. These counts define the neutron capture decay curve for that constituent. At 210, the time constant which is characteristic of the borehole 12 is determined as being the time constant for a constituent such as iron which is predominantly in the borehole 12 (for example as part of the sonde 10); the formation time constant may be determined as in operation 110. If a germanium detector is used in this way, the spectral standards stores 64, 72, 96 and the comparison circuits 62, 70, 94 of FIG. 2 are unnecessary and can be omitted.

Another advantage of the use of a high resolution detector is that many additional choices are available for the constituent whose characteristic time constant $\tau_E$ is used as the borehole time constant $\tau_{hb}$. In particular, the detector material (e.g. germanium) can be used, or an unusual element known not to occur naturally in the formation 16 can be added to the borehole fluid 18, or, for a cased hole, mixed with the casing cement.

The more accurate determination of formation constituents made possible by the present invention in turn allows improved evaluation of other parameters, such as neutron capture cross-section, porosity and salinity, to be made from this data for the formation 16 itself using techniques well known in the art. Likewise, values of neutron capture cross-section and (as noted above) salinity for the borehole 12 alone can be determined, enabling the borehole fluid to be better characterized.

It will be evident to those skilled in the art that the recordings made by the recorder 76, on magnetic tape or other suitable media, can be used for later more extensive processing in accordance with the principles of this invention at a remote location, either in addition to or instead of the processing performed by the surface equipment 24.

There has been described and illustrated herein methods and apparatus in accordance with the present invention for investigating an earth formation traversed by a borehole. While particular embodiments of the invention have been described, it is not intended that the invention be limited thereby. For example, the number of regions assumed to have characteristic thermal neutron capture decay time constants could be more than two. If a third region (e.g. cement for a cased hole) were included, equation (2) would have an additional term comprising the product of the partition of the constituent E in the third region and the time constant for that region. Equation (3) would likewise include the partition for the third region in the sum of partitions on the left-hand side. The time constant for a constituent occurring predominantly in the third region would be used as the characteristic time constant for that region.

Although the invention as described above relies in part on elemental constituents predominantly in the borehole or formation in determining the time constants for those regions, the use of elements is not essential. In addition to the aggregate tool background constituent noted earlier, the spectral standards may include spectra for individual compounds as well as elements. Such a compound occurring primarily in one or other region may be used to determine the time constant for that region. Furthermore, assuming a constituent occurs only in one region is not the only way to derive the time constant for that region. If the partitions of two constituents are known from other data, then two equations like equation (2) above can be written, one for each constituent. Since the borehole and formation time constants $\tau_{bh}$ and $\tau_f$ are assumed to be the same for all constituents of each region, these two equations can be solved for $\tau_{bh}$ and $\tau_f$.

Therefore, as will be apparent to those skilled in the art, various changes and modifications may be made to the invention as described without departing from the spirit and scope of the appended claims.

I claim:

1. A method of determining the partition of constituents as between a subterranean formation and other material in the region of investigation of a well-logging sonde positioned in a borehole traversing said formation, comprising the steps of:
   bombarding said material and said formation with high energy neutrons from said sonde;
   detecting gamma radiation resulting from capture of said neutrons by constituents of said material and said formation, appproximating said gamma radiation detected, and generating a detection signal representative of time and energy of said gamma radiation approximation;
   generating from said detection signal a first signal representative of change in rate of thermal neutron capture in said material;
   generating from said detection signal a second signal representative of change in rate of thermal neutron capture in said formation; and
   generating from said detection signal and said first and second signals an output signal representative of the partition of at least one constituent as between said material and said formation.

2. The method of claim 1, wherein said first signal is representative of change in rate of thermal neutron capture by a first predetermined constituent occurring predominantly in said material and said second signal is representative of change in rate of thermal neutron capture by a second predetermined constituent occurring predominantly in said formation.

3. The method of claim 2, wherein the step of generating said output signal comprises generating from said detection signal an additional signal representative of change in rate of thermal neutron capture by a corresponding constituent of said material and said formation other than said first and second constituents, and combining said additional signal with said first and second signals to determine the partition of the corresponding constituent as between said material and said formation.

4. The method of claim 3, wherein the proportion of a constituent in a selected one of said material and said formation is determined from the difference between a correspondingly selected one of the second and first signals respectively and the additional signal for that constituent, divided by the difference between the first and second signals, and wherein unity minus said proportion is taken as the proportion of that constituent in the other of said material and said formation.

5. The method of claim 1, further including the step of generating from said detection signal a representation of the combined composition of said material and said formation.

6. The method of claim 5, further including the step of combining said output signal and said composition representation to derive a representation of the composition of said formation.

7. The method of claim 5, further including the step of combining said output signal and said composition representation to derive a representation of the composition of said material.

8. The method of claim 1, wherein capture gamma radiation is detected in each of a plurality of successive time intervals and an indication of the rate of thermal neutron capture by each said constituent is derived for each said time interval.

9. The method of claim 8, wherein capture gamma radiation is detected in each of two successive time intervals, and a signal $\tau_E$ representative of change in rate of thermal neutron capture by a constituent is generated according to the equation $$\tau_E = (T_3 + T_4) 2 \log_e(N_3/N_4)$$

where $T_3$ and $T_4$ are the durations of said time intervals and $N_3$ and $N_4$ are the rates of thermal neutron capture by that constituent.

10. The method of claim 2, wherein said detection signal is generated as pulses each corresponding to a respective detected gamma ray, and said pulses are classified and counted as a function of the energy of the corresponding gamma rays to produce a representation of the capture gamma radiation energy spectrum of the combined composition of said material and said formation.

11. The method of claim 10, wherein a representation of the combined composition of said material and said formation is generated by comparing said energy spectrum representation with a combination of weighted standard energy spectra of postulated constituents of said material and said formation, the relative contribution of each constituent to said energy spectrum representation being determined as the weighting for the standard spectrum of that constituent which gives a best fit between said spectrum representation and said combination of spectra.

12. The method of claim 11, wherein said postulated constituents include a member representing the aggregate contribution to said capture gamma radiation of constituents of said sonde, and said first predetermined constituents in said member.

13. The method of claim 11, wherein said determined relative contributions of said constituents are combined with the total number of pulses counted in producing said energy spectrum representation to derive an indication of the rate of thermal neutron capture by each said constituent.

14. The method of claim 13, wherein capture gamma radiation is detected in each of a plurality of successive time intervals and an indication of the rate of thermal neutron capture by each said constituent is derived for each said time interval.

15. The method of claim 14, wherein capture gamma radiation is detected in each of two successive time intervals, and signal $\tau_E$ representative of change in rate of thermal neutron capture by a constituent is generated according to the equation $$\tau_E = (T_3 + T_4)/2 \log_e(N_3/N_4)$$

where $T_3$ and $T_4$ are the durations of said time intervals and $N_3$ and $N_4$ are the rates of thermal neutron capture by that constituent.

16. The method of claim 10, wherein an indication of the rate of thermal neutron capture by each said constituent is derived from the number of pulses counted corresponding to capture gamma radiation in an energy range characteristic of that constituent.

17. The method of claim 16, wherein capture gamma radiation is detected in each of a plurality of successive time intervals and an indication of the rate of thermal neutron capture by each said constituent is derived for each said time interval.

18. The method of claim 17, wherein capture gamma radiation is detected in each of two successive time intervals, and a signal $\tau_E$ representative of change in rate of thermal neutron capture by a constituent is generated according to the equation $$\tau_E=(T_3+T_4)/2\log_e(N_3/N_4)$$

where $T_3$ and $T_4$ are the durations of said time intervals and $N_3$ and $N_4$ are the rates of thermal neutron capture by that constituent.

19. The method of claim 1, further including the steps of:
 detecting gamma radiation resulting from inelastic scattering of said neutrons by constituents of said material and said formation and generating another detection signal representative thereof; and
 generating from said other detection signal a representation of the combined composition of said material and said formation.

20. The method of claim 19, further including the step of combining said output signal and said composition representation to derive a representation of the composition of said formation.

21. The method of claim 19, further including the step of combining said output signal and said composition representation to derive a representation of the composition of said material.

22. The method of claim 2, wherein said first predetermined constituent is one of iron and chlorine.

23. The method of claim 2, wherein said second predetermined constituent is one of silicon, calcium and chlorine.

24. The method of claim 1, wherein said bombarding step is repeated at intervals substantially equal to one hundred and fifty microseconds.

25. The method of claim 1, wherein said first signal is representative of change in rate of thermal neutron capture in a first portion of said material, and further including the step of generating from said detection signal a third signal representative of change in rate of thermal neutron capture in a second portion of said material, said third signal being used in generating said output signal.

26. A method of determining the partition of constituents as between a subterranean formation and other material in the region of investigation of a well-logging sonde positioned in a borehole traversing said formation, comprising the steps of:
 bombarding said material and said formation with high energy neutrons from said sonde;
 detecting gamma ratiation resulting from capture of said neutrons by constituents of said maerial and said formation during a first time interval, approximating said gamma radiation detected, and generating a first detection signal representative of said gamma radiation approximation;
 detecting gamma radiation resulting from capture of said neutrons by constituents of said material and said formation during a second time interval approximating said gamma radiation detected, and generating a second detection signal representative of said gamma radiation approximation;
 generating from said detection signals a first signal representative of change in rate of thermal neutron capture in said material;
 generating from said detection signals a second signal representative of change in rate of thermal neutron capture in said formation; and
 generating from said detection signals and said first and second signals an output signal representative of the partition of at least one constituent as between said material and said formation.

27. The method of claim 26, further including the steps of:
 detecting gamma radiation resulting from inelastic scattering of said neutrons by constituents of said material and said formation and generating another detection signal representative thereof; and
 generating from said other detection signal and said output signal a representation of the respective compositions of said material and said formation.

28. A method of determining the partition of constituents as between a subterranean formation and other material in the region of investigation of a well-logging sonde positioned in a borehole traversing said formation, comprising the steps of:
 bombarding said material and said formation with high energy neutrons from said sonde;
 detecting gamma radiation resulting from capture of said neutrons by constituents of said material and said formation during a first time interval, approximating said gamma radiation detected, and generating a first detection signal representative of said gamma radiation approximation;
 detecting gamma radiation resulting from said capture of said neutrons by constituents of said material and said formation during a second time interval approximating said gamma radiation detected, and generating a second detection signal representative of said gamma radiation approximation;
 generating from said detection signals additional signals representative of change in rate of thermal neutron capture by each constituent of said material and said formation, including a first signal representative of change in rate of thermal neutron capture by a first predetermined constituent occurring predominantly in said material and a second signal representative of change in rate of thermal neutron capture by a second predetermined constituent occurring predominantly in said formation; and
 generating from said first and second signals and each said rate change signal for a constituent other than said first and second predetermined constituents an output signal representative of the partition of that constituent as between said material and said formation.

29. Apparatus for determining the partition of constituents as between a subterranean formation and other material in the region of investigation of a well-logging sonde positioned in a borehole traversing said formation, said sonde bombarding said material and said formation with high energy neutrons thereby generating gamma radiation, comprising:
 means for generating a signal representative of gamma radiation resulting from capture of said neutrons by at least one constituent of said material and said formation;

means for generating from said radiation representative signal a first signal representative of change in rate of thermal neutron capture in said material;

means for generating from said radiation representative signal a second signal representative of change in rate of thermal neutron capture in said formation; and means for generating from said radiation representative signal and said first and second signals an output signal representative of the partition of constituents as between said material and said formation.

30. The apparatus of claim 29, wherein said means for generating said output signal comprises means for generating from said radiation representative signal an additional signal representative of change in rate of thermal neutron capture by a corresponding constituent of said material and said formation other than said first and second constituents, and means for combining said additional signal with said first and second signals to determine the partition of the corresponding constituent as between said material and said formation.

31. The apparatus of claim 30, wherein said combining means is arranged to determine the proportion of a constituent in a selected one of said material and said formation from the difference between a correspondingly selected one of the second and first signals respectively and the additional signal for that constituent, divided by the difference between the first and second signals, and to determine unity minus said porportion as being the proportion of that constituent in the other of said material and said formation.

32. The apparatus of claim 29, further including means for generating from said radiation representative signal a representation of the combined composition of said material and said formation.

33. The apparatus of claim 32, further including means for combining said output signal and said composition representation to derive a representation of the composition of said formation.

34. The apparatus of claim 32, further including means for combining said output signal and said composition representation to derive a representation of the composition of said material.

35. The apparatus of claim 29, wherein capture gamma radiation is detected in each of a plurality of successive time intervals and including means for deriving an indication of the rate of thermal neutron capture by each said constituent for each said time interval.

36. The apparatus of claim 35, wherein capture gamma radiation is detected in each of two successive time intervals, and including means for generating a signal $\tau_E$ representative of change in rate of thermal neutron capture by a constituent according to the equation $$\tau_E = (T_3 + T_4)/2\log_e(N_3/N_4)$$

where $T_3$ and $T_4$ are the durations of said time intervals and $N_3$ and $N_4$ are the rates of thermal neutron capture by that constituent.

37. The apparatus of claim 29, further including:

means for generating another signal representative of gamma radiation resulting from inelastic scattering of said neutrons by constituents of said material and said formation; and means for generating from said other radiation representative signal a representation of the combined composition of said material and said formation.

38. The apparatus of claim 37, further including means for combining said output signal and said composition representation to derive a representation of the composition of said formation.

39. The apparatus of claim 37, further including means for combining said output signal and said composition representation to derive a representation of the composition of said material.

* * * * *